Patented Sept. 8, 1931

1,822,044

UNITED STATES PATENT OFFICE

HANS KRZIKALLA, OF MANNHEIM, AND FRANZ BLUEMMEL, OF SECKENHEIM, GERMANY, ASSIGNORS TO GENERAL ANILINE WORKS, INC., OF NEW YORK, N. Y., A CORPORATION OF DELAWARE

AZO DYESTUFFS

No Drawing. Application filed November 3, 1928, Serial No. 317,111, and in Germany November 17, 1927.

The present invention relates to the production of new azo dyestuffs from diazo compounds of an aminobenzoic acid esterified with alcohols containing more than two atoms of carbon, and a coupling component, and to color lakes obtainable therefrom.

We have found that valuable azo dyestuffs are obtained when the diazo compounds of aminobenzoic acids, or their derivatives, such as halogenated, nitrated or aminobenzoic acids alkylated in the nucleus, which are esterfied with alcohols containing more than two atoms of carbon in the molecule, in particular aliphatic alcohols, for instance propyl- or butyl alcohol, are combined with components capable of being coupled. Coupling components which may be used are for instance naphthols, naphthylamines and their derivatives such as their sulfonic acids, diketones capable of coupling in the enol form, for example acetylacetone, benzoylacetone, acetyl acetic anilides, pyrazolones and the like. The dyestuffs so obtained give dyeings on wool, which, to a large extent, are distinguished by their excellent properties as regards fastness and more especially as regards fastness to light and washing. Those of the aforedescribed dyestuffs as contain no sulfonic acid groups can also directly be employed as pigment dyes. In order to produce insoluble colored compounds of the azo dyestuffs containing sulfo groups they are converted into insoluble salts, for instance of the alkaline earth metals, aluminium, tin and the like, or into salts of strong organic bases as for instance cyclohexylamine, dicyclohexylamine, guanidine and the like. The color lakes and pigments obtained in the said manner are highly suitable for the preparation of colored lacquers, paints for wall paper, printing or graphical purposes. The salts of the strong organic bases are soluble in alcohol and may therefore be used for preparing spirit varnishes.

The following examples will further illustrate the nature of the said invention which however is not limited thereto. The parts are by weight.

Example 1

19.3 parts of anthranilic-n-butyl ester are diazotized in concentrated hydrochloric acid, with the addition of ice, in any known and suitable manner, and the liquid obtained is run into a solution of 36 parts of sodium 2-naphthol-3.6-disulfonate, rendered alkaline with sodium carbonate. The dyestuff filtered off by suction when the coupling is complete, gives extremely fast, bright orange dyeings on wool. The anthranilic-n-butyl ester may also be replaced by the corresponding p-amino-benzoic ester.

Example 2

The solution of the diazo compound of 29.1 parts of the sulfate of anthranilic-n-butyl ester is run into an aqueous solution of 25.4 parts of 1-(4'-sufophenyl)-3-methyl-5-pyrazolone and 150 parts of anhydrous sodium carbonate. The dyestuff filtered off by suction after stirring for from 2 to 3 hours, gives fast, handsome yellow dyeings on wool, the fastness to light being particularly conspicuous. It is also very suitable for the preparation of a color lake. If the said pyrazolone be replaced by 1-(5'-sulfo-2'-chlorphenyl)-3-methyl-5-pyrazolone, a dyestuff furnishing yellow shades with a more greenish tinge is obtained. From the latter dyestuff a yellow color lake which is very fast to light may be produced by converting it into the barium salt.

Example 3

Under the conditions specified in Example 2, the solution of 29.1 parts of the diazo compound of the sulfate of anthranilic-n-butyl ester and the solution of 31.5 parts of 2-pheny-amine-8-naphthol-6-sulfonic acid rendered alkaline by soda ash, furnishes a dyestuff which gives fast red brown dyeings on wool.

*Example 4*

36.3 parts of sodium 1.8-aminonaphthol-3.6-disulfonate in the condition of a slightly acidified, thin paste, are introduced into the solution of the diazo compound of 13.8 parts of p-nitraniline. When the coupling is completed, the liquid is rendered alkaline with sodium carbonate, and treated with the diazo solution of 19.3 parts of anthranilic-n-butyl ester. The resulting dyestuff is salted out at about 50° C., filtered by suction, re-dissolved if necessary, and dried. It gives fast black dyeings on wool.

What we claim is:—

1. As new articles of manufacture azo dyestuffs corresponding to the general formula:

in which R stands for a radicle of a benzoic acid in which the acid group is esterified by butyl alcohol, and X stands for a radicle of a 1-sulfophenyl-3-methyl-5-pyrazolone.

2. As new articles of manufacture azo dyestuffs corresponding to the general formula:

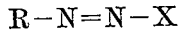

in which R stands for a radicle of a benzoic acid in which the acid group is esterified by butyl alcohol, and X stands for a radicle of a 1-(5'-sulfo-2'-chlorphenyl)-3-methyl-5-pyrazolone.

3. As a new article of manufacture the yellow barium salt of the azo dyestuff corresponding to the general formula:

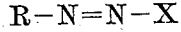

in which R stands for the radicle of benzoic acid esterified by n-butyl alcohol and X stands for the radicle of 1-(5'-sulfo-2'-chlorphenyl)-3-methyl-5-pyrazolone.

4. As a new article of manufacture the azo dyestuff dyeing wool fast yellow shades, corresponding to the formula:

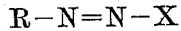

in which R stands for the radicle of benzoic acid esterified by n-butyl alcohol and X stands for the radicle of 1-(4'-sulfophenyl)-3-methyl-5-pyrazolone.

In testimony whereof we have hereunto set our hands.

HANS KRZIKALLA.
FRANZ BLUEMMEL.